(12) United States Patent
Kao

(10) Patent No.: US 7,143,997 B2
(45) Date of Patent: Dec. 5, 2006

(54) PLUG ASSEMBLY FOR A FAUCET TO AUTOMATICALLY STOP WATER FLOW

(75) Inventor: Yu-Yueh Kao, Taipei (TW)

(73) Assignee: Highplus International Co., Ltd., Taipei (TW)

( * ) Notice: Subject to any disclaimer, the term of this patent is extended or adjusted under 35 U.S.C. 154(b) by 143 days.

(21) Appl. No.: 11/028,026

(22) Filed: Jan. 3, 2005

(65) Prior Publication Data

US 2006/0145117 A1    Jul. 6, 2006

(51) Int. Cl.
*F16K 31/12*    (2006.01)
*F16K 31/00*    (2006.01)
(52) U.S. Cl. .......................................... 251/339; 251/48
(58) Field of Classification Search ................ 251/339, 251/48, 64
See application file for complete search history.

(56) References Cited

U.S. PATENT DOCUMENTS

| | | | | |
|---|---|---|---|---|
| 2,989,249 A | * | 6/1961 | Richter | 239/427 |
| 4,512,551 A | * | 4/1985 | Dalferth | 251/339 |
| 4,940,206 A | | 7/1990 | Sheen | 251/52 |
| 5,131,622 A | * | 7/1992 | Chang | 251/43 |
| 5,286,000 A | * | 2/1994 | Katz | 251/339 |

FOREIGN PATENT DOCUMENTS

| | | |
|---|---|---|
| DE | 3916472 | 10/1990 |
| DE | 4407721 | 9/1995 |
| GB | 2253463 | 9/1992 |

* cited by examiner

*Primary Examiner*—Justine R. Yu
*Assistant Examiner*—Andrew J. Rost
(74) *Attorney, Agent, or Firm*—Alan D. Kamrath; Nikolai & Mersereau, P.A.

(57) ABSTRACT

A plug assembly for a faucet includes a casing adapted for engagement with the faucet, a cylinder securely received in the casing and having an isolator having a tapered through hole defined through the isolator and slits to communicate with the outlets of the cylinder, a top ring supported by the cylinder to sandwich the isolator with the cylinder, wherein the top ring has a hole defined through a bottom face of the top ring. A control rod is slidably received in the tapered through hole of the isolator and the hole of the top ring. A push rod is securely connected to the control rod to sandwich a friction ring with the control rod. An adjusting device is provided to adjust deformation of the friction ring such that the engagement of the friction ring to the inner periphery of the tapered through hole is adjusted.

20 Claims, 6 Drawing Sheets

PLUG ASSEMBLY FOR A FAUCET TO AUTOMATICALLY STOP WATER FLOW

BACKGROUND OF THE INVENTION

1. Field of the Invention

The present invention relates to a plug assembly, and more particularly to a plug assembly adapted for engagement with a faucet to automatically stop water flow from the faucet.

2. Description of Related Art

Water is one of the major natural assets necessary for life. However, people often consider water as an infinite resource in their specific environment and do not really care about the importance of water. After the introduction of the faucet, water wasting became one major problem in the control of natural resources as people tend not to turn off the faucet even when the original intention of cleaning something has already finished. To diminish the waste, a plug system for the faucet is using infrared as a sensing measure to provide water whenever there is a blockage to the infrared rays and to shut off the water supply automatically when the blockage to the infrared is removed.

However, it is well known that using infrared as a sensing measure is expensive and requires remodeling of the faucet structure, which renders this faucet uneconomic. Furthermore, such a faucet is not easily repaired when it has malfunctioned.

To overcome the shortcomings, the present invention tends to provide an improved plug assembly to mitigate the aforementioned problems.

SUMMARY OF THE INVENTION

The primary objective of the present invention is to provide a plug assembly to automatically shut off water supply without need for remodeling of the faucet structure.

In order to accomplish the aforementioned objective, the plug assembly of the present invention provides a friction ring slidably received in a tapered passage defined in an isolator such that friction between the friction ring and an inner periphery defining the passage of the isolator determines the duration of water supply after the friction ring is pushed.

Another objective of the present invention is that the plug assembly has a friction adjusting device to adjust the friction between the friction ring and the inner periphery of the passage of the isolator such that the water supply duration is able to be adjusted.

Other objects, advantages and novel features of the invention will become more apparent from the following detailed description when taken in conjunction with the accompanying drawings.

DETAILED DESCRIPTION OF THE PREFERRED EMBODIMENT

Figure 1:
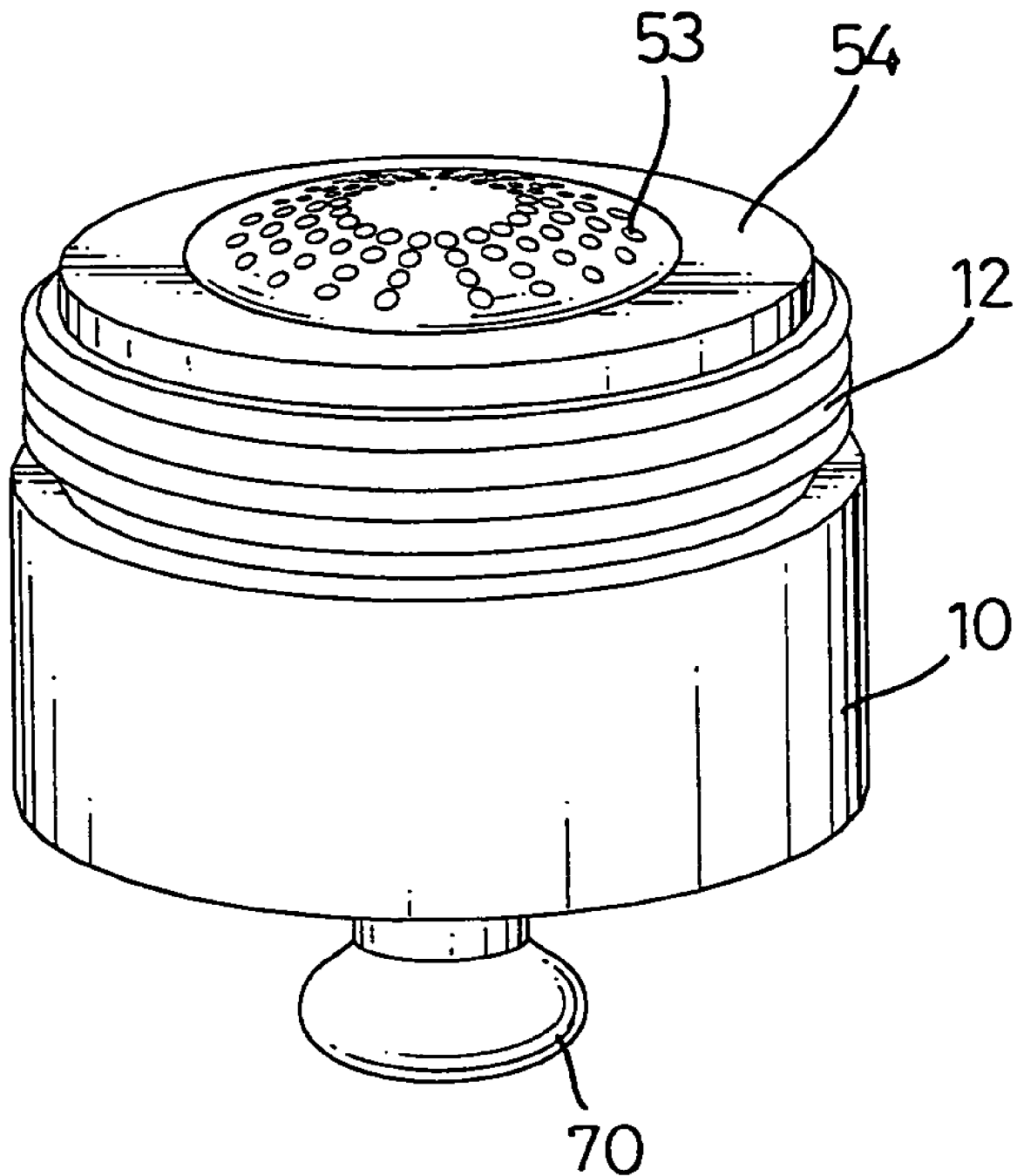
FIG. 1 is a perspective view of the plug assembly of the present invention.
Figure 2:
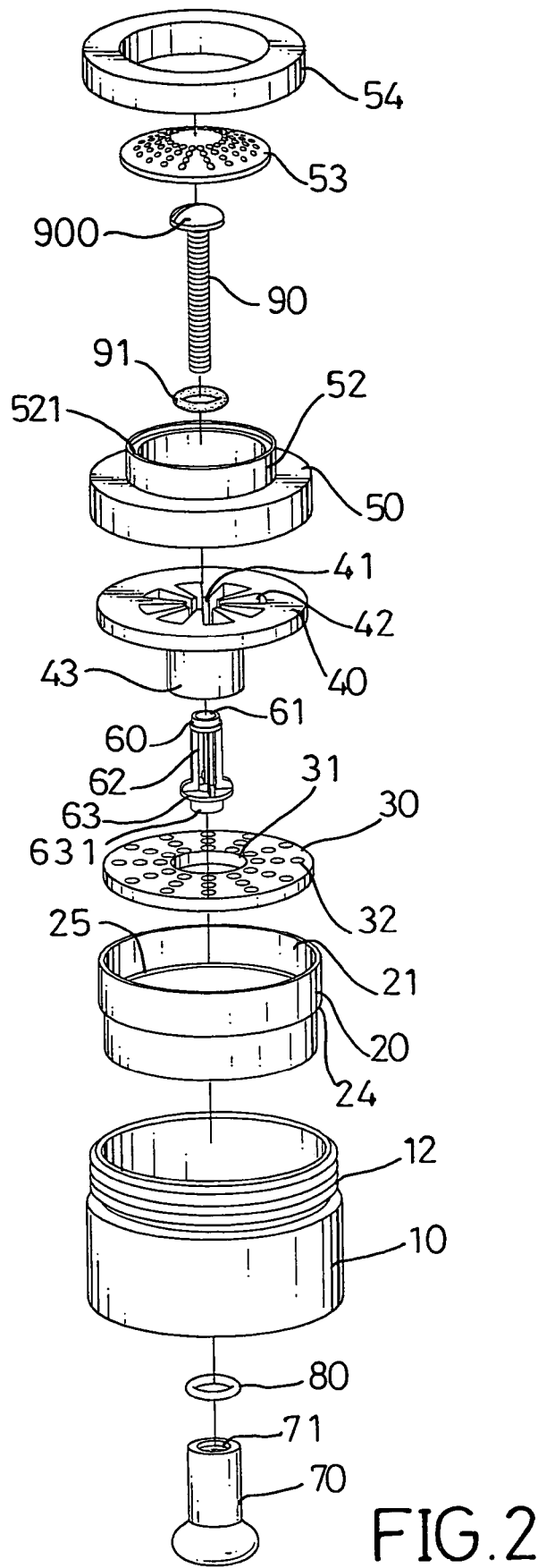
FIG. 2 is an exploded perspective view of the plug assembly of the present invention.

With reference to FIGS. 1 and 2, the plug assembly in accordance with the present invention includes a casing (10), a cylinder (20), a dispersion plate (30), an isolator (40), a top ring (50), a control rod (60), a push rod (70), a friction ring (80) and a screw (90).

Figure 3:
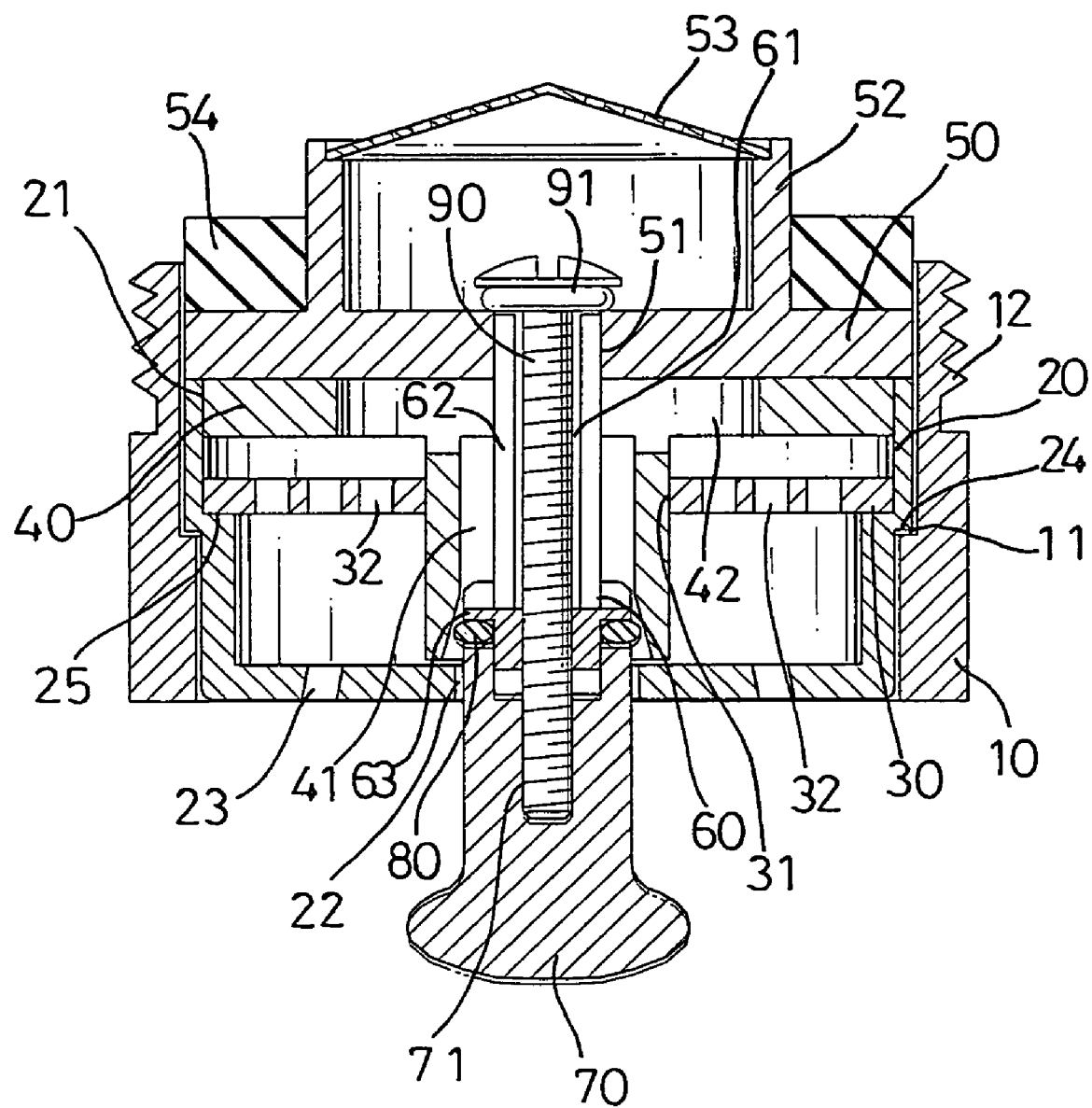
FIG. 3 is a cross sectional view showing the inner structure of the plug assembly of the present invention.
Figure 4:
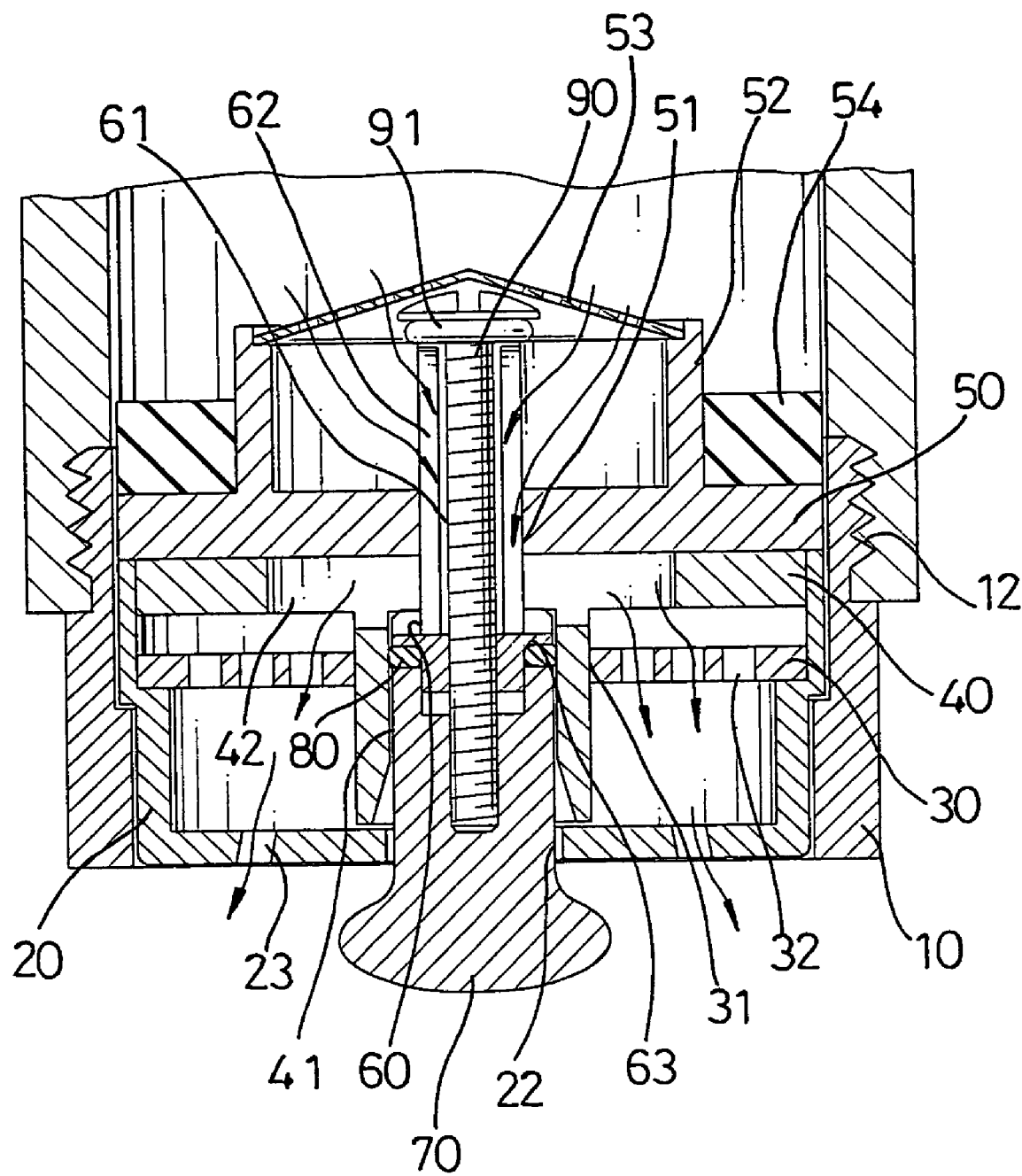
FIG. 4 is a schematic view showing the status of the plug assembly after the push rod is pushed.
Figure 5:
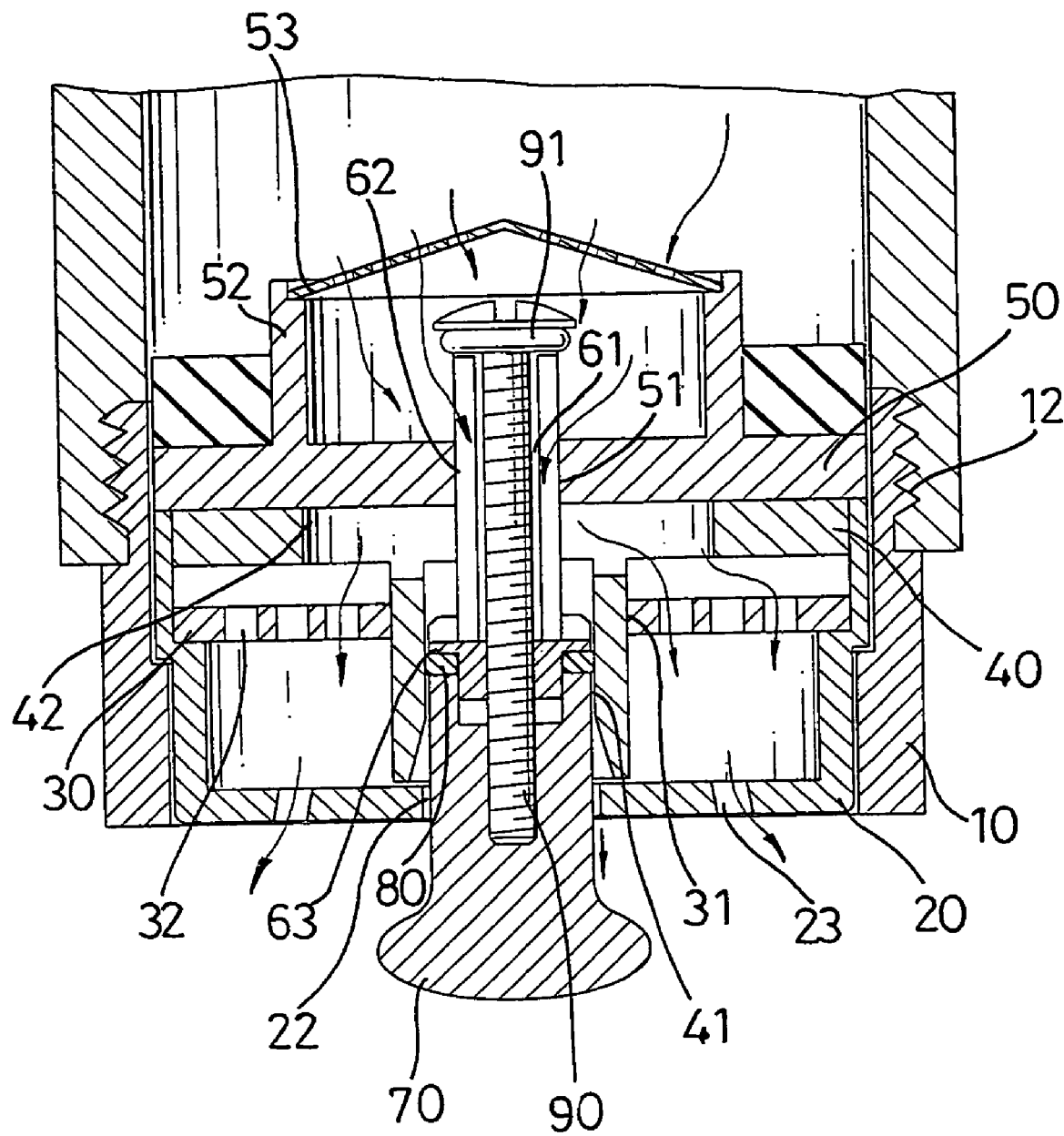
FIG. 5 is a schematic view showing that the friction ring is moved inside the passage of the isolator.

With reference to FIG. 3 and still using FIG. 2 for reference, the casing (10) is a hollow cylinder with two open ends. The casing (10) has a first step (11) formed on an inner face of the casing (10) and an outer threading (12) formed on an outer periphery of one of the open ends.

The cylinder (20) has an open end (21) and a closed end with an assembly hole (22) defined through a face of the closed end, multiple outlets (23) defined around the assembly hole (22), a shoulder (24) formed on an outer periphery of the cylinder (20) to correspond to the first step (11) of the casing (10) and a second step (25) formed on an inner periphery of the cylinder (20).

The dispersion plate (30) has a central hole (31) corresponding to the assembly hole (22) of the cylinder (20) and multiple apertures (32) defined around the central hole (31).

The isolator (40) has a tapered through hole (41) defined through the isolator (40) to communicate with the central hole (31) of the dispersion plate (30) and the assembly hole (22) of the cylinder (20), and multiple slits (42) defined in a top face of the isolator (40) to communicate with the through hole (41). The isolator (40) further has an extension (43) extending downward from a bottom face of the isolator (40) so that the isolator has substantially a T shape in cross section.

The top ring (50) has a hole (51) defined through the top ring (50), an annular ring (52) formed on top of the top ring (50) and having an inner shoulder (521) defined in an open end of the annular ring (52) to support thereon a filter (53) and an engagement ring (54) rested on top of the top ring (50) to encircle the annular ring (52).

The control rod (60) has a central through hole (61) defined to communicate with the central hole (31) of the dispersion plate (30), the through hole (41) of the isolator (40) and the hole (51) of the top ring (50), multiple cutouts (62) defined in an outer periphery of the control rod (60) to correspond to the slits (42) of the isolator (40) and an annular stop (63) formed on the outer periphery of the control rod (60) and having a boss (631) integrally formed on a bottom end of the control rod (60).

The push rod (70) has a threaded hole (71) defined to correspond to the central through hole (61) of the control rod (60).

With reference to FIG. 3, it is noted that when the plug assembly of the present invention is assembled, the cylinder (20) is first received in the casing (10) with the shoulder (24) abutting the first step (11) of the casing (10) so that the cylinder (20) is able to be securely received inside the casing (10). Then the dispersion plate (30) is placed inside the cylinder (20) to have the dispersion plate (30) supported by the second step (25). After top ring (50) is supported by a top face of the cylinder (20) to sandwich the isolator (40) and the dispersion plate (30) with the cylinder (30), the control rod (60) is inserted into the through hole (41) of the isolator (40), the screw (90) is extended through a sealing ring (91), the hole (51) of the top ring (50), the through hole (41) of the isolator (40), the central through hole (61) of the control rod (60), the central hole (31) of the dispersion plate (30), the assembly hole (22) of the cylinder (20), the friction ring (80) and into the threaded hole (71) of the push rod (70). Because the sealing ring (91) has a diameter larger than a diameter of the hole (51) and the screw (90) has a head (900) formed on a distal end of the screw (90) to engage with the sealing ring (91) and having a diameter larger than that of the sealing ring (91), the top ring (50), the isolator (40), the dispersion plate (30) and the cylinder (20) are securely combined. Then the filter (53) is placed inside the top ring (50) to be supported by the inner shoulder (521). Lastly, the engagement ring (54) is placed on the top ring (50) to encircle the annular ring (52).

When the plug assembly of the present invention is used, the user first screws the casing (10) to a faucet (not shown) via the outer threading (12) to secure the plug assembly to the faucet. After the faucet is turned on, because the sealing ring (91) is securely engaged with a periphery defining the hole (51) of the top ring (50), water is not able to flow through the hole (51), the through hole (41), the apertures (32) of the dispersion plate (30) and the outlets (23) of the cylinder (20). However, when the push rod (70) is pushed upward relative to the casing (10), the upward movement of the push rod (70) will drive the friction ring (80), the control rod (60), the sealing ring (91) and the screw (90) to move upward relative to the top ring (50). After the friction ring (80), the control rod (60), the sealing ring (91) and the screw (90) are moved upward, a gap is defined between the top ring (50) and the sealing ring (91) such that water is able to flow through the hole (51), the slits (42), the cutouts (62) of the control rod (60), the apertures (32) of the dispersion plate (30) and the outlets (23) of the cylinder (20) to flow out of the plug assembly of the present invention.

When water is able to flow out of the plug assembly of the present invention, due to the water pressure applied to the head (900) of the screw (90) and the sealing ring (91), the control rod (60) and the push rod (70) will gradually move downward relative to the top ring (50). Again, because the through hole (41) of the isolator (40) is tapered, friction between the friction ring (80) and the inner periphery of the through hole (41) slows the downward movement of the control rod (60) and the push rod (70). After the friction ring (80) reaches a portion where the diameter is much larger than that of the friction ring (80), the control rod (60) together with the push rod (70) returns to its original position to allow the sealing ring (91) to block the water supply to the hole (51) again. Therefore, it is noted that the plug assembly of the present invention is able to block the water flow via friction between the friction ring (80) and the inner periphery defining the through hole (41) of the isolator (40).

Furthermore, if the screw (90) screws deeper into the threaded hole (71) of the push rod (70), deformation of the friction ring (80) between the annular stop (63) and a top face defining the threaded hole (71) of the push rod (70) is increased such that the friction of the friction ring (80) to the inner periphery defining the through hole (41) is increased. Thus duration of a water supply flowing out of the plug assembly of the present invention is prolonged. On the contrary, if the screw (90) is loosened, the deformation of the friction ring (80) to the inner periphery of the through hole (41) is decreased and thus the water supply duration is decreased.

Figure 6:
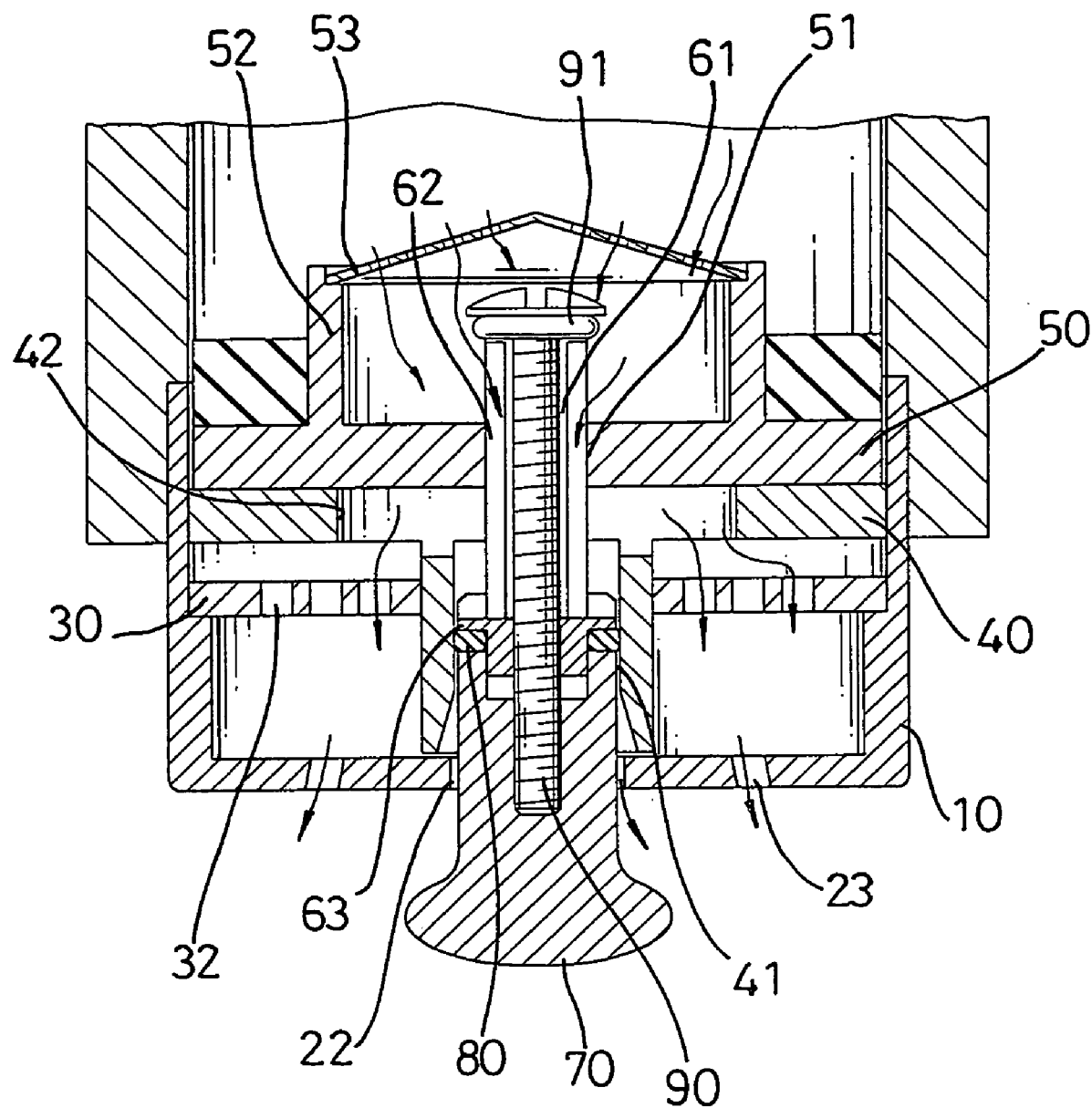
FIG. 6 is a schematic view showing that the casing is removed and the cylinder is interference fitted to the faucet.

Although the connection between the casing (10) and the cylinder (20) is described in detail and the casing (10) provided with the outer threading (12) is for connection with the faucet, it is noted that the casing (10) may be deleted as shown in FIG. 6 and the cylinder (20) may thus be interference fitted to the faucet so that manufacture cost for the element casing (10) is saved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A plug assembly for a faucet, the plug assembly comprising:
    a casing adapted for engagement with the faucet and having two open ends respectively defined in two opposite ends of the casing;
    a cylinder securely received in the casing and having an open end and a closed end which has multiple outlets defined through a face of the closed end;
    an isolator securely received in the cylinder and having a tapered through hole defined through the isolator and slits defined in a top face of the isolator to communicate with the outlets of the cylinder;
    a top ring supported by the cylinder to sandwich the isolator with the cylinder, the top ring having a hole defined through a bottom face of the top ring;
    a control rod slidably received in the tapered through hole of the isolator and the hole of the top ring and having multiple cutouts defined in an outer periphery of the control rod to alternately communicate with the hole of the top ring;
    a push rod securely connected to a distal end of the control rod to sandwich a friction ring with the control rod, the push rod being movable relative to the cylinder and the friction ring engaging with an inner periphery defining the tapered through hole;
    an adjusting device sealingly combining the push rod, the control rod, the isolator and the top ring to selectively adjust deformation of the friction ring such that the engagement of the friction ring to the inner periphery of the tapered through hole is adjusted such that after the push rod is moved upward relative to the cylinder to have communication among the hole, the slits, the cutouts, and the outlets, the friction of the friction ring to the inner periphery of the tapered through hole determines time duration of the push rod returning to its original position to shut the communication among the hole, the slits, the cutouts, and the outlets and thus water supply from the faucet is blocked after the adjusting device is engaged with the top ring.

2. The plug assembly as claimed in claim 1, wherein the adjusting device is composed of a sealing ring selectively engaged with a periphery defining the hole so as to block the water supply from the faucet to the outlet of the cylinder.

3. The plug assembly as claimed in claim 2 further comprising a filter securely received in the top ring.

4. The plug assembly as claimed in claim 3 further comprising a dispersion plate sandwiched between the cylinder and the isolator and having a central hole defined to allow an extension of the control rod and multiple apertures defined through the dispersion plate to allow a communication between the slits and the outlets.

5. The plug assembly as claimed in claim 4, wherein the casing has a first step formed on an inner periphery thereof and the cylinder has a shoulder formed on an outer periphery of the cylinder to be supported by the first step such that the cylinder is able to be securely received in the casing.

6. The plug assembly as claimed in claim 5, wherein the cylinder has a second step formed on an inner periphery of the cylinder to support the dispersion plate so that the dispersion plate is securely received in the cylinder.

7. The plug assembly as claimed in claim 6, wherein the control rod has an annular stop formed on the control rod and a boss formed on a bottom face of the annular stop to have the friction ring mounted therearound such that the friction ring is sandwiched between the push rod and the annular stop of the control rod.

8. The plug assembly as claimed in claim 7, wherein the adjusting device further has a screw extending through the sealing ring, the top ring, the tapered through hole, the central through hole of the control rod, the central hole of the dispersion plate, an assembly hole defined in a closed end of the cylinder, the friction ring and into the push rod to securely engage with the push rod.

9. The plug assembly as claimed in claim 8 further comprising a filter securely supported by an inner shoulder formed on an inner periphery of the top ring and an engagement ring rested on top of the top ring.

10. The plug assembly as claimed in claim 9, wherein the top ring further has an annular ring formed on top of the top ring and the engagement ring is mounted around the annular ring.

11. The plug assembly as claimed in claim 10, wherein the casing has an outer threading formed on an outer periphery of the casing for engagement with the faucet.

12. The plug assembly as claimed in claim 6, wherein the adjusting device further has a screw extending through the sealing ring, the top ring, the tapered through hole, the central through hole of the control rod, the central hole of the dispersion plate, an assembly hole defined in a closed end of the cylinder, the friction ring and into the push rod to securely engage with the push rod.

13. The plug assembly as claimed in claim 5, wherein the adjusting device further has a screw extending through the sealing ring, the top ring, the tapered through hole, the central through hole of the control rod, the central hole of the dispersion plate, an assembly hole defined in a closed end of the cylinder, the friction ring and into the push rod to securely engage with the push rod.

14. The plug assembly as claimed in claim 4, wherein the adjusting device further has a screw extending through the sealing ring, the top ring, the tapered through hole, the central through hole of the control rod, the central hole of the dispersion plate, an assembly hole defined in a closed end of the cylinder, the friction ring and into the push rod to securely engage with the push rod.

15. The plug assembly as claimed in claim 2 further comprising a dispersion plate sandwiched between the cylinder and the isolator and having a central hole defined to allow an extension of the control rod and multiple apertures defined through the dispersion plate to allow a communication between the slits and the outlets.

16. The plug assembly as claimed in claim 1 further comprising a filter securely received in the top ring.

17. The plug assembly as claimed in claim 1 further comprising a dispersion plate sandwiched between the cylinder and the isolator and having a central hole defined to allow an extension of the control rod and multiple apertures defined through the dispersion plate to allow a communication between the slits and the outlets.

18. A plug assembly for a faucet, the plug assembly comprising:
    a cylinder adapted for engagement with the faucet and having an open end and a closed end which has multiple outlets defined through a face of the closed end for communication with the faucet;
    an isolator securely received in the cylinder and having a tapered through hole defined through the isolator and slits defined in a top face of the isolator to communicate with the outlets of the cylinder;
    a top ring supported by the cylinder to sandwich the isolator with the cylinder, the top ring having a hole defined through a bottom face of the top ring;
    a filter securely received in the top ring;
    a control rod slidably received in the tapered through hole of the isolator and the hole of the top ring and having multiple cutouts defined in an outer periphery of the control rod to alternately communicate with the hole of the top ring;
    a dispersion plate sandwiched between the cylinder and the isolator and having a central hole defined to allow an extension of the control rod and multiple apertures defined through the dispersion plate to allow a communication between the slits and the outlets;
    a push rod securely connected to a distal end of the control rod to sandwich a friction ring with the control rod, the push rod being movable relative to the cylinder and the friction ring engaging with an inner periphery defining the tapered through hole;
    an adjusting device sealingly combining the push rod, the control rod, the isolator and the top ring to selectively adjust deformation of the friction ring such that the engagement of the friction ring to the inner periphery of the tapered through hole is adjusted such that after the push rod is moved upward relative to the cylinder to have communication among the hole, the slits, the cutouts, and the outlets, the friction of the friction ring to the inner periphery of the tapered through hole determines time duration of the push rod returning to its original position to shut the communication among the hole, the slits, the cutouts, and the outlets and thus water supply from the faucet is blocked after the adjusting device is engaged with the top ring,
    wherein the adjusting device is composed of a sealing ring selectively engaged with a periphery defining the hole so as to block the water supply from the faucet to the outlet of the cylinder.

19. The plug assembly as claimed in claim 18, wherein the cylinder has a second step formed on an inner periphery of the cylinder to support the dispersion plate so that the dispersion plate is securely received in the cylinder,
    wherein the control rod has an annular stop formed on the control rod and a boss formed on a bottom face of the annular stop to have the friction ring mounted therearound such that the friction ring is sandwiched between the push rod and the annular stop of the control rod,
    wherein the top ring further has an annular ring formed on top of the top ring and the engagement ring is mounted around the annular ring.

20. The plug assembly as claimed in claim 19, wherein the adjusting device further has a screw extending through the sealing ring, the top ring, the tapered through hole, the central through hole of the control rod, the central hole of the dispersion plate, an assembly hole defined in a closed end of the cylinder, the friction ring and into the push rod to securely engage with the push rod,
    the filter is securely supported by an inner shoulder formed on an inner periphery of the top ring and an engagement ring rested on top of the top ring.

\* \* \* \* \*